US010451746B2

(12) United States Patent
Marsden

(10) Patent No.: US 10,451,746 B2
(45) Date of Patent: Oct. 22, 2019

(54) DETECTOR AND METHOD OF OPERATION

(71) Applicant: Kromek Limited, Sedgefield (GB)

(72) Inventor: Edward Marsden, Sedgefield (GB)

(73) Assignee: Kromek Limited, Sedgefield (GB)

(*) Notice: Subject to any disclaimer, the term of this patent is extended or adjusted under 35 U.S.C. 154(b) by 86 days.

(21) Appl. No.: 15/562,083

(22) PCT Filed: Apr. 4, 2016

(86) PCT No.: PCT/GB2016/050950
§ 371 (c)(1),
(2) Date: Sep. 27, 2017

(87) PCT Pub. No.: WO2016/156882
PCT Pub. Date: Oct. 6, 2016

(65) Prior Publication Data
US 2018/0074215 A1    Mar. 15, 2018

(30) Foreign Application Priority Data
Apr. 2, 2015  (GB) .................................. 1505732.6

(51) Int. Cl.
*G01T 1/20*     (2006.01)
*G01T 1/164*    (2006.01)
(Continued)

(52) U.S. Cl.
CPC .......... *G01T 1/2018* (2013.01); *G01T 1/1647* (2013.01); *G01T 7/005* (2013.01); *G01T 1/40* (2013.01)

(58) Field of Classification Search
CPC ....... G01T 1/2018; G01T 1/1647; G01T 1/40; G01T 7/005
(Continued)

(56) References Cited

U.S. PATENT DOCUMENTS 4,677,300 A * 6/1987 Tawil .................... G01T 1/2018
250/366
7,005,646 B1   2/2006 Jordanov et al.
(Continued)

FOREIGN PATENT DOCUMENTS

EP          0965861 A1    12/1999
WO   WO-2006064403 A2     6/2006

OTHER PUBLICATIONS

Harshaw/QS Scintillation Detector Catalogue, Scintillation Counting Principles, Saint Gobain Industries 1992, pp. 4-9.
(Continued)

*Primary Examiner* — Yara B Green
*Assistant Examiner* — Abra S Fein
(74) *Attorney, Agent, or Firm* — Winstead PC

(57) ABSTRACT

A method of operation of a scintillator detector includes a scintillator and a photodetector is described, together with a device embodying the method. The method includes the steps of: periodically producing a light pulse; impinging at least some of the light from a successive plurality of such light pulses onto a light-receptive part of the photodetector; measuring the electrical response of the photodetector; processing the electrical response of the photodetector to determine a pulse height and a variance of pulse height; numerically processing the pulse height and variance of pulse height so determined to obtain at least a first data item characteristic of the response of the photodetector.

18 Claims, 6 Drawing Sheets

(51) Int. Cl.
*G01T 7/00* (2006.01)
*G01T 1/40* (2006.01)

(58) Field of Classification Search
USPC .................................................. 250/363.02
See application file for complete search history.

(56) References Cited

U.S. PATENT DOCUMENTS

| | | |
|---|---|---|
| 7,157,681 B1 | 1/2007 | Tetzlaff |
| 2004/0036026 A1 | 2/2004 | Engdahl et al. |
| 2005/0269513 A1 | 12/2005 | Ianakiev et al. |
| 2008/0111079 A1 | 5/2008 | Stein et al. |
| 2010/0128852 A1 | 5/2010 | Yamamoto et al. |
| 2012/0267536 A1* | 10/2012 | Gagnon ................ G01T 1/1644 250/363.03 |
| 2013/0221227 A1* | 8/2013 | Watanabe ............. G01T 1/2018 250/366 |

OTHER PUBLICATIONS

Johnstone, John, "International Search Report," prepared for PCT/GB2016/050950, dated Jun. 20, 2016, four pages.
Autiero, D., et al., "A High Stability Light Emitting Diode System for Monitoring Lead Glass Electromagnetic Calorimeters," Nuclear Instruments & Methods in Physics Research, Section A: Accelerators, Spectrometers, Detectors, and Associated Equipment, vol. A372, No. 3, Apr. 1, 1996, pp. 556-561.
Pattison, John E., "Enhancement of Natural Background Gamma-Radiation Dose Around Uranium Microparticles in the Human Body," J. R. Soc. Interface, Published Sep. 23, 2009, pp. 603-611.

* cited by examiner

DETECTOR AND METHOD OF OPERATION

The invention relates to a method of operation of a scintillator radiation detector such as might be used for example for the detection of ionizing radiation including high energy electromagnetic radiation and in particular gamma rays or for the detection of subatomic particle radiation including neutrons. The invention is in particular a method of operation of a scintillator radiation detector to provide for the in use calibration and/or the gain stabilisation of the detector. The invention additionally relates to a detector configured for the performance of such a method, in particular to facilitate its calibration and/or gain stabilisation in use.

Scintillator materials, which exhibit scintillation when excited by ionizing radiation, are widely used as the basis for a detector for ionizing radiation and for example for the detection of high energy electromagnetic radiation and in particular gamma rays. A scintillation detector may be formed for example by coupling the scintillator material to a light transducer such as a photomultiplier by means of which an electrical signal may be obtained from which incoming radiation can be detected and characterised.

The use of a scintillation detector for example comprising a scintillator and photomultiplier is widespread in the field of radiation detection and monitoring, and finds particular application in compact portable and for example hand held radiation meters, such as might be used for detecting and quantifying/characterising radioactive contamination, for the monitoring of radioactive materials and sources and for similar applications. In discussion herein examples are given of gamma ray scintillator detectors. However these are examples only of the wide range of potential uses of a suitably selected scintillator within a detector in the field of high energy physics and in the detection of ionizing radiation such as high energy electromagnetic radiation and in particular gamma rays or subatomic particle radiation including neutrons.

Accurate detector calibration and gain stabilisation are critical factors for the operational effectiveness of scintillation detectors. Without proper calibration, data the analysis of data collected by the detector cannot be performed meaningfully. Without detector response stability the analysis of data collected by the detector cannot be performed consistently or predictably over an operational period.

The gain, or response, of all scintillation detectors exhibits a degree of variability (or drift). In particular in the case of gamma ray scintillation detectors, the measured position of a characteristic gamma energy photo-peak can be seen to move over a period of time. This can be a result of several factors, including instability of bias voltages and the gradual degradation of detector components. In the short term however temperature dependence is the primary cause of calibration instability, due to the inherent characteristics of several components in the signal chain, including the scintillating crystal, photo-detector and electronic signal processing stage.

As these stages are effectively connected in series their contribution to gain drift can be simply combined.

$$G_{Total} = G_{Scint} G_{Photo-Det} G_{Amp}$$

The temperature stability of the scintillator and photo-detectors are readily accessible from standard texts and manufacturers' data (see for example FIGS. 7 and 8). Temperature drift in signal processing stages should be less significant, and can readily be determined by circuit evaluation.

Although temperature compensation algorithms can and are applied to mitigate short term drift as operating temperature varies, particularly in field instruments, these techniques require thorough characterisation for a wide range of devices. Furthermore they are not useful to improve long term stability, and cannot help identify calibration drift caused by crystal/photo-detector degradation.

The most accurate method of detector calibration and gain stabilisation is to perform regular multipoint calibrations, using known isotopic radiation sources as reference sources. Such a reference source is measured by the detector. The measured data is then compared with the expected energy spectrum of the reference source, and the detector gain is adjusted, if necessary, to provide a match between the measured and expected energy spectra. However for widely deployed detector networks this is impractical, and there is accordingly a desire to develop detector calibration and gain stabilisation methods that are more practical for widely deployed detector networks, for example including portable detectors in the field.

The use of natural radiation background is an alternative method, which has been employed as described for example in US patent publication 20100128852A1. The technique typically makes use of the 1.461 MeV photo peak from $^{40}$K. However the count rate from this isotope is variable and general very low in a small detector. In laboratory tests this has been measured at a rate of typically <0.1 cps for a 1"$^3$CsI(Tl) scintillator. At this rate several hours are required to gather sufficient data to locate the peak with a reasonable degree of confidence. While this can be useful to evaluate detectors with known stability it is difficult to automate due to the variability in rate and the potential presence of other background sources. FIG. 9 shows a typical background trace for a NaI(Tl) detector. The characteristic peaks at 1460 keV due to 40K and at 2610 keV due to 208Tl (in the 232Th series) are apparent.

An alternative approach is to employ a stable pulsed light source to produce a repeatable signal in the detector. An example of this approach can be found in U.S. Pat. No. 7,005,646B1. There are however two problems with this method. The first is that while a light pulse will characterised the photo-detector and subsequent signal processing stages, it does not reveal variation in light output from scintillating crystal, which, as shown in FIG. 7, can be up to 20% for standard Alkaline Halide scintillators over a temperature range of −20 to +50° C. Secondly the light source used, typically LEDs, are themselves subject to variation with temperature, as shown in FIGS. 10 and 11.

The invention seeks to provide for the calibration and in particular the gain stabilisation of a scintillator radiation detector, for example for the detection of high energy electromagnetic radiation and in particular gamma rays or for the detection of subatomic particle radiation, in a manner that mitigates some or all of the above problems.

The invention seeks to mitigate some of the problems associated with prior art pulsed LED source methods and systems.

In accordance with the invention in a first aspect there is provided a method of operation of a scintillator detector comprising a scintillator and a photodetector, the method comprising the steps of:

periodically producing a light pulse;

impinging at least some of the light from a successive plurality of such light pulses onto a light-receptive part of the photodetector;

measuring the electrical response of the photodetector;

processing the electrical response of the photodetector to determine a pulse height and a variance of pulse height;

numerically processing the pulse height and variance of pulse height so determined to obtain at least a first data item characteristic of the response of the photodetector;

and optionally verifying the electrical response of the photodetector by comparing at least the first data item against a predetermined reference response;

and optionally additionally or alternatively outputting a control signal to the photodetector, which signal is modified in part responsive at least to the value of the first data item.

The method thus involves in general principle the use of a stable pulsed light source to illuminate the photodetector, for example on power up or during use, and the numerical processing of the response of the photodetector to that pulsed illumination, for example to verify the response of the photodetector and optionally further to generate a control signal that is fed back to the photodetector to modify the response of the photodetector for example to calibrate and/or stabilise the gain of the photodetector. The method thus provides a ready in situ verification of the photon sensitivity of the photodetector and in the preferred case a method of controlling the calibration and/or gain stabilisation of the photodetector.

The key characterising feature of the method, at its broadest, is that a determination is obtained numerically of a pulse height and a variance of pulse height. The determined pulse height and variance of pulse height are co-processed numerically to obtain a data item characteristic of the response of the photodetector. In particular preferably a first data item so obtained is correlated to the total number of photons detected at the photodetector, and for example comprises a count of the total number of photons detected at the photodetector.

As a result a set of data is generated that is relatively insensitive to the variations in the light pulse luminosity, for example with temperature. Thus the step of verifying the response of the photodetector and for example of generating and outputting a control signal back to the photodetector, since it makes use of both a pulse height and a variance of pulse height, may similarly be made relatively insensitive to the variations in the light pulse luminosity, for example with temperature. This addresses one of the particular disadvantages of some similar prior art systems.

The light source is in a preferred case, particularly for use in a system providing for compact and for example portable operation in the field, A light-emitting diode (LED) source comprising one or more LEDs. As used herein a light-emitting diode (LED) source may include an LED configured to emit light directly via intrinsic electroluminescence and/or an LED given a suitable coating to modify emitted wavelength, and may encompass narrow near monochromatic sources and broad spectrum sources as required.

The scintillator comprises in familiar manner at least one scintillator material that exhibits scintillation when excited by radiation, for example ionizing radiation, and for example high energy electromagnetic radiation such as gamma rays, or the ionizing products generated on interaction with neutrons. The photodetector comprises in familiar manner a photoelectric transducer and is for example a photomultiplier, or solid state device such as a photodiode or silicone photomultiplier (SiPM). The photodetector is coupled to the scintillator material and thereby an electrical signal may be obtained representative of the luminescence response of the scintillator material and from which incoming radiation can be detected and characterised in accordance with known principles.

The scintillator comprises at least one scintillator material that exhibits scintillation when excited by radiation, for example ionizing radiation, or the ionizing products generated on interaction with neutrons. The scintillator for example comprises one or more inorganic crystalline materials, or organic scintillating compound Suitable materials scintillators for use with detectors for high energy electromagnetic radiation include alkali metal halides and other crystalline materials, which may typically be doped with an activator as a low level impurity. Suitable scintillator materials based on alkali metal halides will be familiar and include sodium iodide for example doped with thallium (NaI(Tl)) which is particularly preferred, cesium iodide for example doped with thallium (CsI(Tl)) or with sodium (CsI(Na)) or undoped, cesium fluoride for example undoped, and potassium iodide for example doped with thallium (KI(Tl)). For other applications scintillator materials based on non-alkali crystals might be considered including in particular bismuth germanate (BGO).

Neutron scintillation detectors typically comprise a neutron capture isotope such as $^6$Li or $^{10}$B, either mixed or chemically combined with a scintillating compound such as ZnS:Ag, LiI, whereby the high energy reaction products from neutron interactions with the capture compound produce scintillation in the scintillator.

The photodetector comprises a photoelectric transducer coupled to the scintillator material to generate an electrical signal in response to its luminescence and is for example a photomultiplier. In the preferred case the photoelectric transducer is a solid state transducer, for example comprising an avalanche photodiode and is in the most preferred case a silicon photomultiplier.

The invention at its broadest is characterised by the determination of both a pulse height and a variance of pulse height, and by the numerical co-processing of both of these to verify the electrical response of the photodetector for example against a predetermined reference response and/or to generate a control signal that is modified in part responsive to each of these and for example depends functionally on each of these so as to develop a method that is relatively insensitive to variations in the light source, for example with temperature.

Even so it remains useful to correct for variations in the response of the system with temperature. Thus, in a preferred embodiment, the method further comprises a light source temperature compensation step, wherein a measurement is taken of the temperature of the light source, and a correction factor is applied to the measured response of the photodetector, for example dynamically pulse by pulse, that corrects for the known variation of the light output of the light source with temperature. Additionally or alternatively in a preferred embodiment, the method further comprises a photodetector temperature compensation step, wherein a measurement is taken of the temperature of the photodetector, and a correction factor is applied to the measured response of the photodetector, for example dynamically pulse by pulse, that corrects for the known variation of the photodetector response with temperature.

For example in the preferred case, where a LED light source is used, LED output is known to vary with temperature both in respect of intensity and chromacity. In this case the temperature compensation step preferably includes application of a correction factor to the measured response of the photodetector to take account of one or both of such variations.

Further refinements based on known techniques from established methods based on pulsed light and for example pulsed LED to improve the verification/calibration/gain stabilisation of a scintillator detector should not be considered excluded from the scope of the invention, unless inherently contradictory to the basic characterising method step of the invention. In particular, further known techniques for compensating for temperature drift in LED response would routinely be considered as additional refinements of the method of the invention and the invention encompasses methods with such additional steps.

The light source may in a possible embodiment be configured to emit light in the visible spectrum for example in some part of the wavelength range of about 400 to 700 nm. The light source is in a preferred case an LED source comprising one or more LEDs. For example the light source may comprise one or more visible light LEDs configured to emit light in some part of the visible spectrum.

In a possible preferred embodiment of the invention the light source may additionally or alternatively be configured to emit light in the ultraviolet spectrum for example in some part of the wavelength range of about 10 nm to 400 nm. The light source is in a preferred case an LED source comprising one or more LEDs. For example the light source may comprise one or more UV LEDs configured to emit light in some part of the ultraviolet spectrum.

An advantage of a UV source is that it may produce a response in the scintillator, allowing an interrogation of scintillator brightness as well as photodetector gain change.

Thus, in a preferred embodiment of the method of the first aspect, the method additionally comprises:

periodically producing a light pulse including light in the ultraviolet spectrum;

impinging at least some of the UV light from a successive plurality of such light pulses onto a light-receptive part of the scintillator;

inducing photon emission in the scintillator in the visible spectrum measuring the electrical response of the scintillator;

processing the electrical response of the scintillator to obtain at least a second data item characteristic of the response of the scintillator;

and optionally verifying the electrical response of the scintillator by comparing at least the second data item against a predetermined reference response;

and optionally additionally or alternatively outputting a control signal to the photodetector, which signal is modified in part responsive at least to the value of the second data item.

In a preferred case, the method comprises the use of a visible light source impinging on the photodetector to obtain the first data item and thereby a measure of photodetector gain change and the use of a separate ultraviolet light source impinging on the scintillator to obtain the second data item and thereby a measure of scintillator brightness. For example the method may employ a visible light LED source and a UV LED source.

Where the response of the visible and UV LED are matched, the temperature dependent luminous intensity of the UV LED can be compensated by the known (calculated) brightness of the visible LED. A visible LED, well matched to the UV LED, can be realised by over-coating a UV LED with a temperature stable fluorescent material.

Although the use of a UV light source is discussed herein in particular as a preferred and additional refinement of the method of the first aspect of the invention, it can be envisaged that in certain applications the use of a UV light source to obtain a characterisation of the scintillator, and for example the second data item above, may have value independently of the photodetector interrogation of the first aspect of the invention. Accordingly in a possible further aspect there is provided a method of operation of a scintillator detector comprising a scintillator and a photodetector, the method comprising the steps of interrogation of the scintillator herein described, in particular to determine the second data item via the steps above, performed independently.

That is to say, in a possible further aspect there is provided a method of operation of a scintillator detector comprising a scintillator and a photodetector, the method comprising periodically producing a light pulse including light in the ultraviolet spectrum;

impinging at least some of the UV light from a successive plurality of such light pulses onto a light-receptive part of the scintillator;

inducing photon emission in the scintillator in the visible spectrum measuring the electrical response of the scintillator;

processing the electrical response of the scintillator to obtain at least a data item characteristic of the response of the scintillator;

and optionally verifying the electrical response of the scintillator by comparing at least the said data item against a predetermined reference response;

and optionally additionally or alternatively outputting a control signal to the photodetector, which signal is modified in part responsive at least to the value of the said data item.

Where features relating to any source of or use of UV light to generate a measured electrical response in the scintillator are discussed herein in the context of the method of the first aspect of the invention or as features of any specific embodiment to implement the method of the first aspect of the invention, the skilled person will appreciate that they could be applied as features of the method of the second aspect of the invention by analogy.

In accordance with the invention in a third aspect there is provided a scintillator detector comprising a scintillator and a photodetector that includes specific adaptation to enable the foregoing method of the first aspect of the invention to be performed during operation of the device, for example on power up or in use.

Accordingly, a scintillator detector in this aspect comprises in its broadest embodiment:

a scintillator;

a photodetector;

a pulsed light source positioned to illuminate a light-receptive part of the photodetector;

a means to measure the electrical response of the photodetector;

a processing module to process the electrical response of the photodetector and determine a pulse height and a variance of pulse height, and to numerically process the pulse height and variance of pulse height so determined to obtain at least a first data item characteristic of the response of the photodetector;

optionally a verifier to verify the electrical response of the photodetector by comparing at least the first data item against a predetermined reference response;

and optionally additionally or alternatively a control module to output a control signal to the photodetector, which signal is modified in part responsive at least to the value of the first data item.

Preferred features of the invention in this aspect will be understood by analogy with the first aspect.

In a particular embodiment, a source of pulsed UV light is provided positioned to illuminate a light-receptive part of the scintillator, and the detector further comprises:

a means to measure the electrical response of the scintillator;

a processing module to process the electrical response of the scintillator and obtain at least a second data item characteristic of the response of the scintillator;

optionally a verifier to verify the electrical response of the scintillator by comparing the second data item against a predetermined reference response;

and optionally additionally or alternatively a control module to output a control signal to the photodetector, which signal is modified in part responsive at least to the value of the second data item.

In a particular embodiment, the scintillator detector is configured as a gamma ray detector. Other detector functionality may additionally be provided. For example the scintillator detector configured as a gamma ray detector may be provided in combination with a thermal neutron detector.

In a particular embodiment, the scintillator detector is used in a portable detector and for example a portable gamma ray detector, and is in accordance with the invention adapted for ready verification/calibration/control in the field. For example in such an embodiment the elements of the scintillator detector of the invention in this aspect are provided compactly associated together in a housing, for example with suitable additional components for portable operation such as a portable battery power source, a portable visual display etc and/or with suitable additional detectors. In a particular embodiment a portable detector includes a gamma ray scintillator detector in accordance with the invention in combination with a thermal neutron detector.

In accordance with the invention in a fourth aspect there is provided a scintillator detector comprising a scintillator and a photodetector that includes specific adaptation to enable the foregoing method of the second aspect of the invention to be performed during operation of the device, for example on power up or in use.

Accordingly, a scintillator detector in this aspect comprises in its broadest embodiment:

a scintillator;

a photodetector;

a source of pulsed UV light positioned to illuminate a light-receptive part of the scintillator;

a means to measure the electrical response of the scintillator;

a processing module to process the electrical response of the scintillator and obtain at least one data item characteristic of the response of the scintillator;

optionally a verifier to verify the electrical response of the scintillator by comparing the scintillator response data item against a predetermined reference response;

and optionally additionally or alternatively a control module to output a control signal to the photodetector, which signal is modified in part responsive at least to the value of the scintillator response data item.

Preferred features of the invention in this fourth aspect will be understood by analogy with the second aspect. Additionally where features relating to any source of or use of UV light to generate a measured electrical response in the scintillator are discussed herein in the context of the method of the first aspect of the invention or as features of any specific embodiment of device of the third aspect of the invention, the skilled person will appreciate that they could be applied as features of the device of the fourth aspect of the invention by analogy.

The invention will now be described by way of example only with reference to the accompanying drawings in which.

Figure 1:
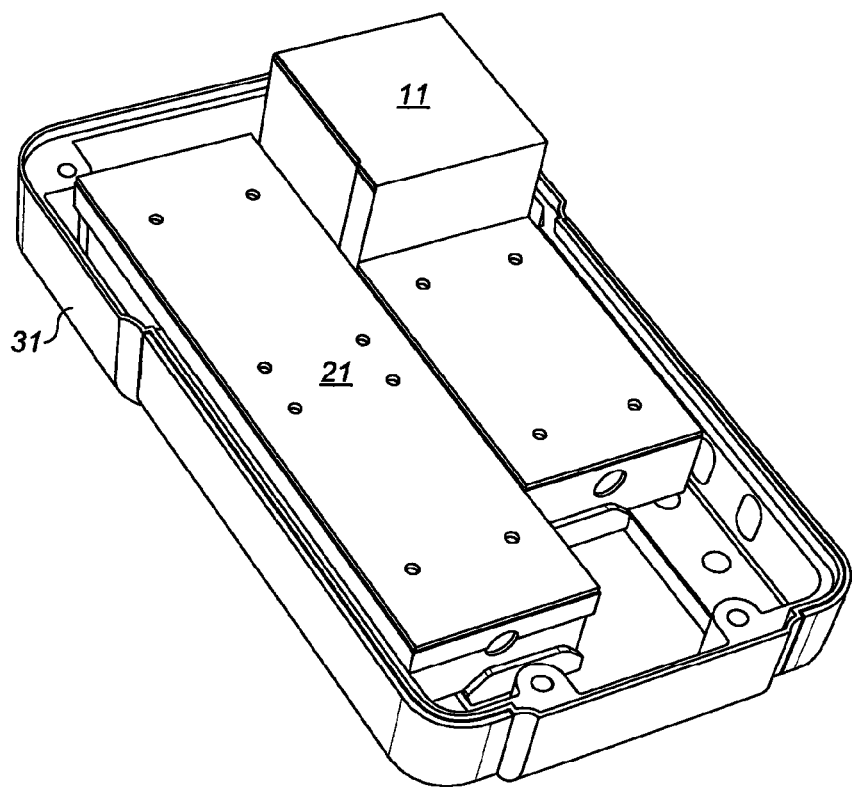
FIG. 1 is an exploded partial view of a portable detector including a scintillator detector having a neutron detector module and a gamma ray detector module to which the principles of the invention may be applied.

An example implementation of the invention is described with reference to a portable detector with dual functionality for gamma rays and thermal neutrons comprising a high sensitivity gamma ray scintillator and a thermal neutron detector in a single package. The embodiment uses a gamma detector module (11) using a 25 mm×25 mm×25 mm CsI(Tl) scintillator for gamma rays, and a neutron detector module (21) using a 25 mm×100 mm $^6$LiF:ZnS scintillator for thermal neutrons. The components are compactly associated together within a housing (31). The modules are shown with the housing partially open in FIG. 1.

The light from each scintillator is detected by an array of Silicon Photomultipliers (SiPMs). A general schematic of the arrangement of scintillators, SiPMs and control electronics modules is shown in exploded view in FIG. 2. In the case of the CsI(Tl) gamma detector the SiPMs are mounted on a PCB and attached to the crystal. The $^6$LiF:ZnS thermal neutron scintillator uses an acrylic light guide, not shown, to channel the light to the SiPMs. The exploded view shows respectively a gamma scintillator (12) and SiPM (13) arrangement with a gamma digital board (14) and gamma analogue board (15); and a neutron scintillator (22) and SiPM (23) arrangement with a neutron digital board (24) and neutron analogue board (25).

Figure 2:
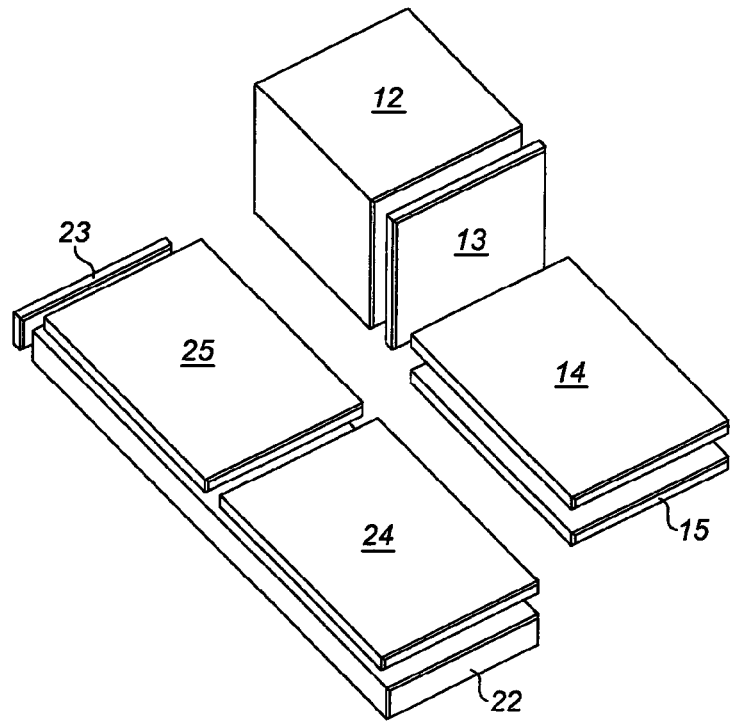
FIG. 2 is an exploded schematic of the processing modules of a portable detector such as illustrated in FIG. 1.
Figure 3:
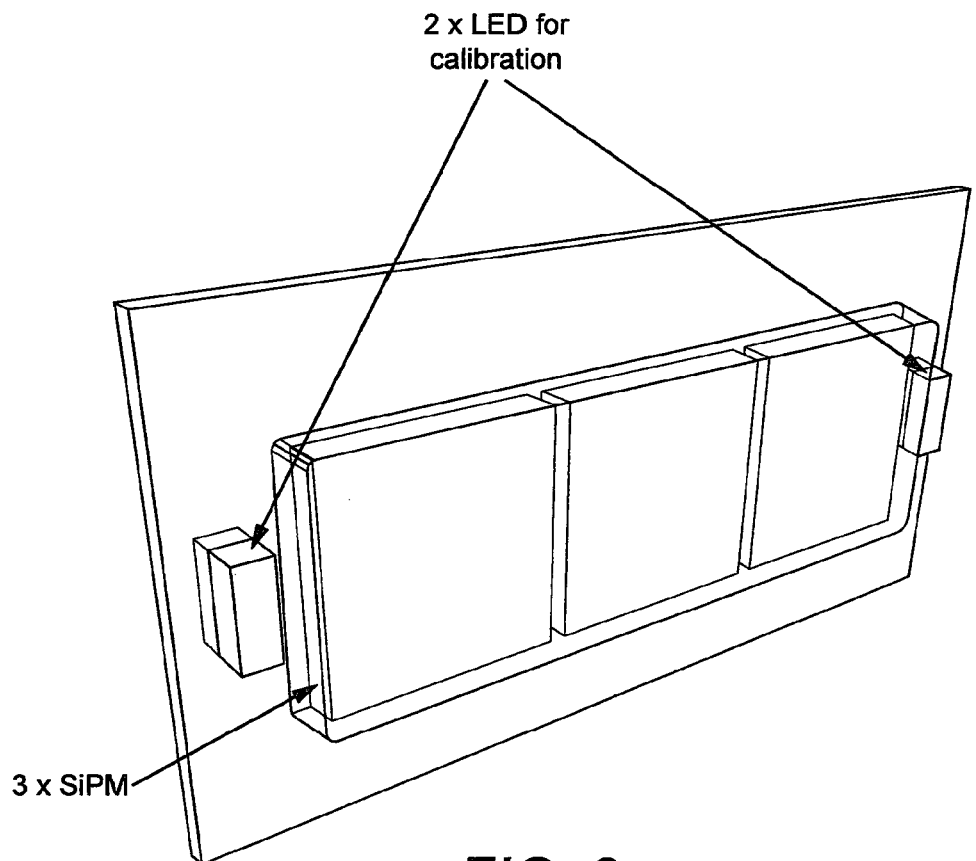
FIG. 3 is an example embodiment of a gamma ray detector arrangement such as illustrated in FIG. 2 modified with visible LED sources for calibration in accordance with the principles of the invention.

FIG. 3 is an example embodiment of a gamma ray detector arrangement such as illustrated in the combined detector of FIG. 2 modified with visible LED sources for calibration in accordance with the principles of the invention. A 7 mm×21 mm three SiPM arrangement has blue light LEDs at either end to provide a source of pulsed light in accordance with the principles of the invention.

In the embodiment a compact and portable combined gamma and neutron detector is shown. In accordance with the FIG. 3 modification a gamma ray detector arrangement such as illustrated in the combined portable detector of FIG. 2 is modified by use of a puled LED source in accordance with the principles of the invention. This is by way of illustration. It will be appreciated that the principles of the invention are not limited to such a combination detector or to the modification of the gamma ray detector in such a combined portable detector.

Figure 4:
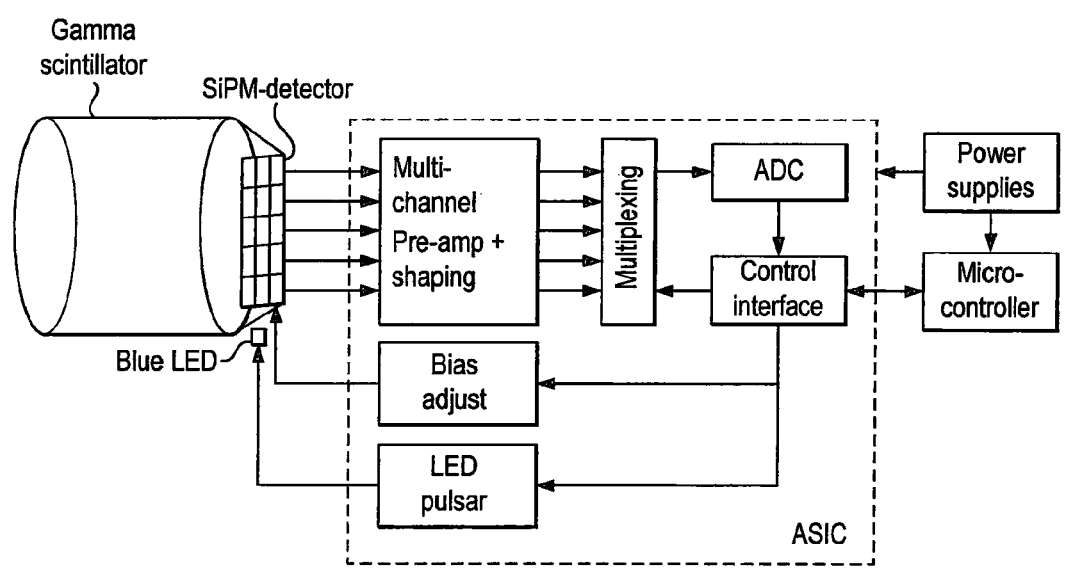
FIG. 4 is a simple schematic of the control electronics for a system embodying a blue LED for calibration in accordance with the principles of the invention.

FIG. 4 is a simple schematic of the control electronics for a system embodying a blue LED for calibration in accordance with the principles of the invention. A single blue LED is shown. The control electronics comprises an ASIC that includes an LED pulsar module to cause the LED to produce a successive plurality of periodic light pulses that impinge on the light-receptive part of the SiPM-detector and modules to measure and process the electrical response of the photodetector as described in general above and in accordance with the principles discussed below.

Figure 5:
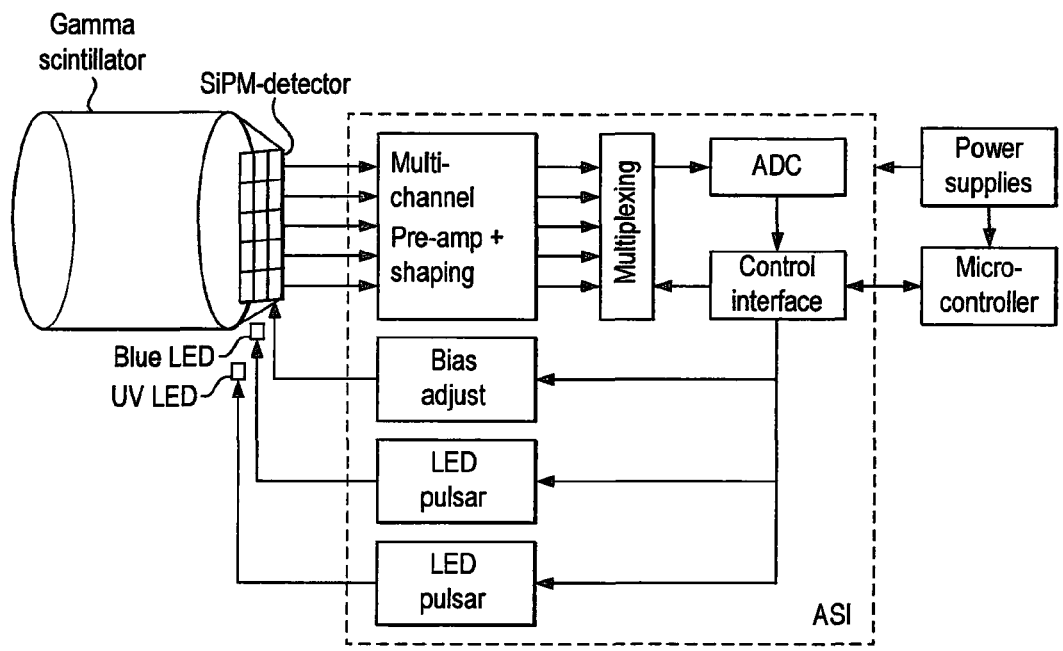
FIG. 5 is a simple schematic of the control electronics for a system additionally embodying a UV LED in accordance with the principles of the invention.

FIG. 5 is a simple schematic of the control electronics for a system additionally embodying a UV LED in accordance with the principles of the invention. The ASIC includes a further LED pulsar module to cause the UV LED to produce a successive plurality of periodic UV pulses that impinge on the light-receptive part of the scintillator.

Figure 6:
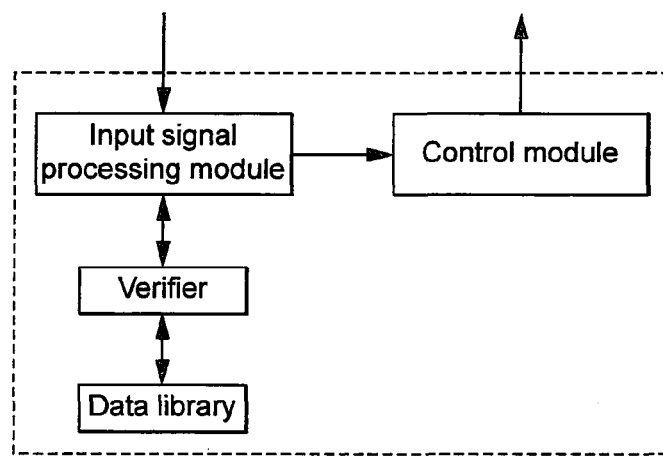
FIG. 6 is a simple schematic of a suitable arrangement of data processing and feedback where a reference library is used.

FIG. 6 is a simple schematic of a suitable arrangement of data processing and feedback logic where a reference library is used to verify the electrical response of the photodetector and/or scintillator by comparing a measured response against a predetermined reference response.

As discussed above, accurate detector calibration and gain stabilisation are critical factors for the operational effectiveness of scintillation detectors. The gain, or response, of all scintillation detectors exhibits a degree of variability (or drift).

Figure 7:
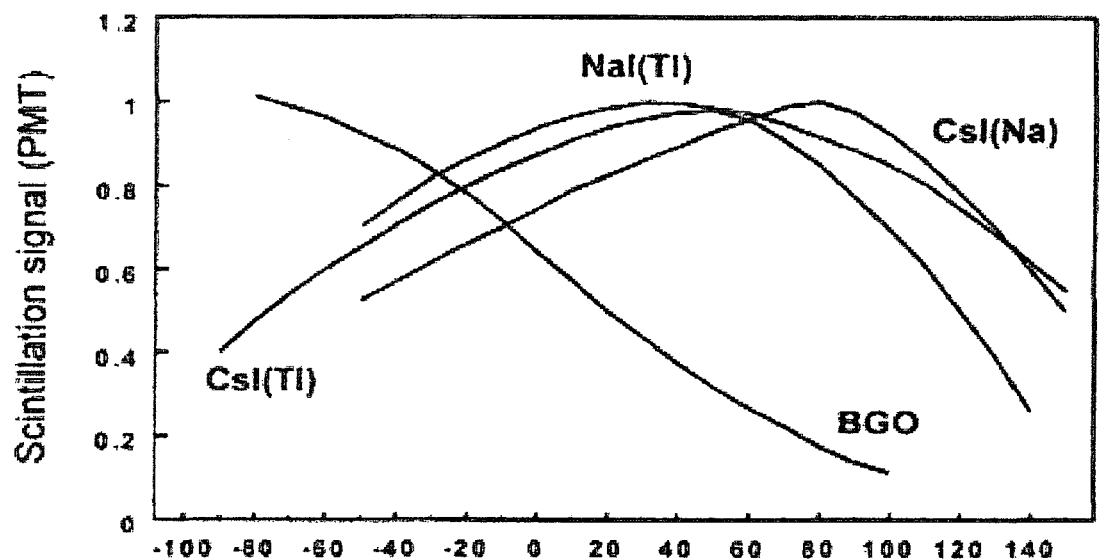
FIG. 7 shows the temperature dependence of the scintillation yield of typical known inorganic scintillators.
Figure 8:
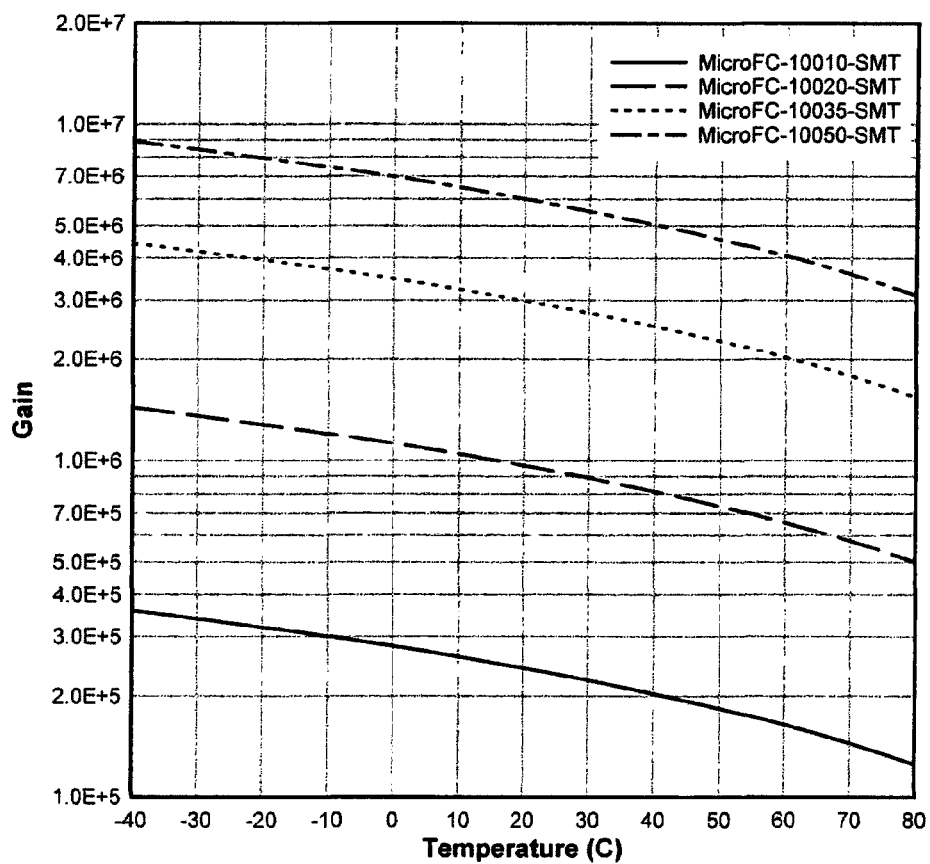
FIG. 8 shows the temperature dependence of the gain of typical known silicon photomultipliers.
Figure 9:
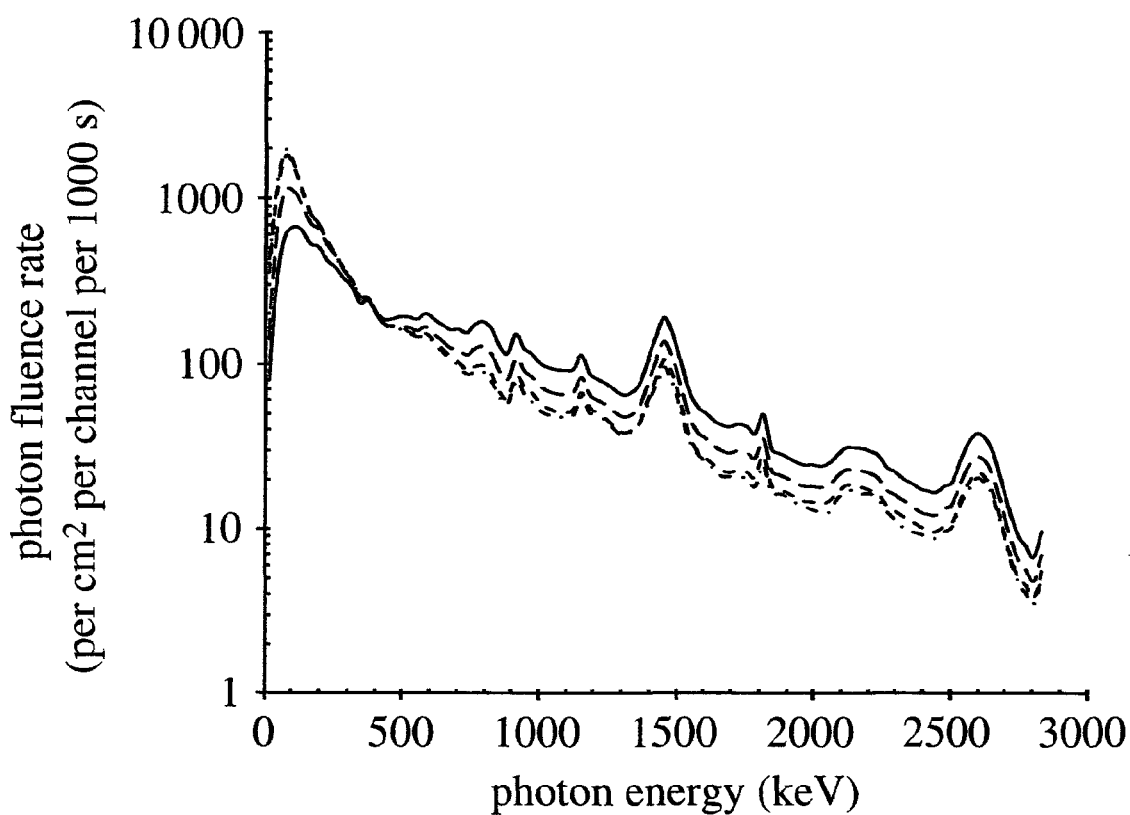
FIG. 9 shows an incident isotropic free-in-air gamma-radiation fluence-rate spectrum for a NaI(Tl) detector.

FIGS. 7 and 8 show data for known systems that illustrate some of the underlying causes of the problem, taken from the manufacturer's published data in each case. FIG. 7 shows the temperature dependence of the scintillation yield of typical known inorganic scintillators (Harshwa/QS scintillation detector catalogue—Saint Gobain Industries 1992) including the CsI(Tl) scintillator used in the embodiment. FIG. 2 shows the temperature dependence of the gain of SensL's FC series SiPMs.

As discussed above, the use of natural radiation background as a source for calibration is known. However the method can be difficult to automate due to the variability in rate and the potential presence of other background sources. FIG. 7 shows a typical background trace for a NaI(Tl) detector (John E. Pattison, Enhancement of natural background gamma-radiation dose around uranium microparticles in the human body, DOI: 10.1098/rsif.2009.0300, Published 23 Sep. 2009). The characteristic peaks at 1460 keV due to 40K and at 2610 keV due to 208Tl (in the 232Th series) are apparent.

Figure 10:
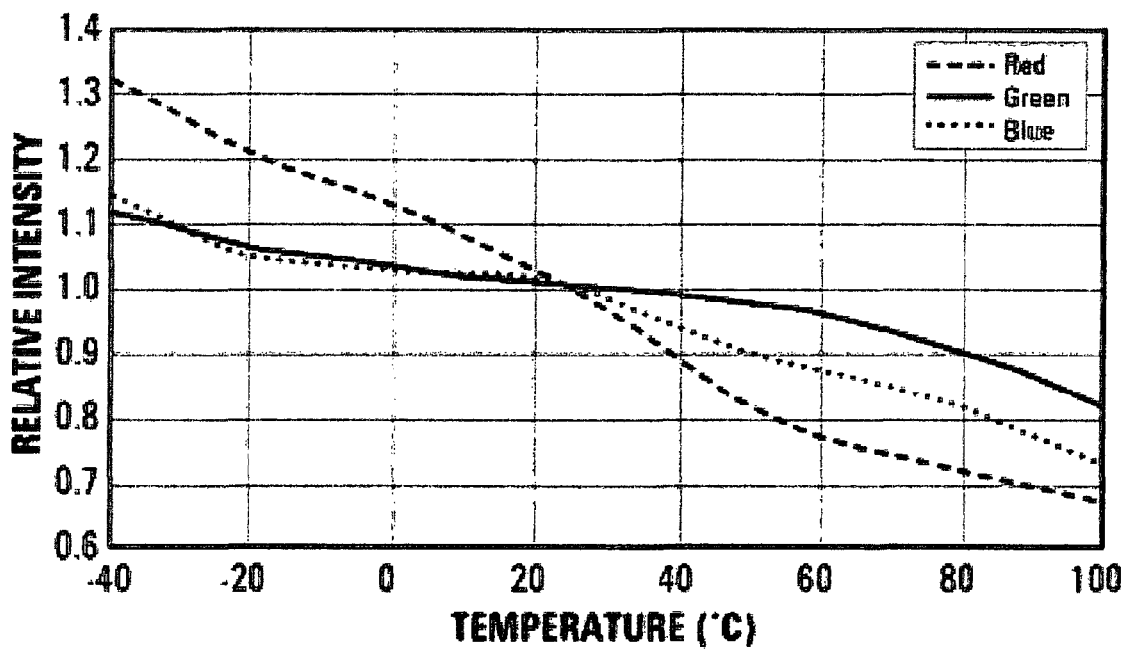
FIG. 10 shows the relative intensity shift with temperature of a known LED.
Figure 11:
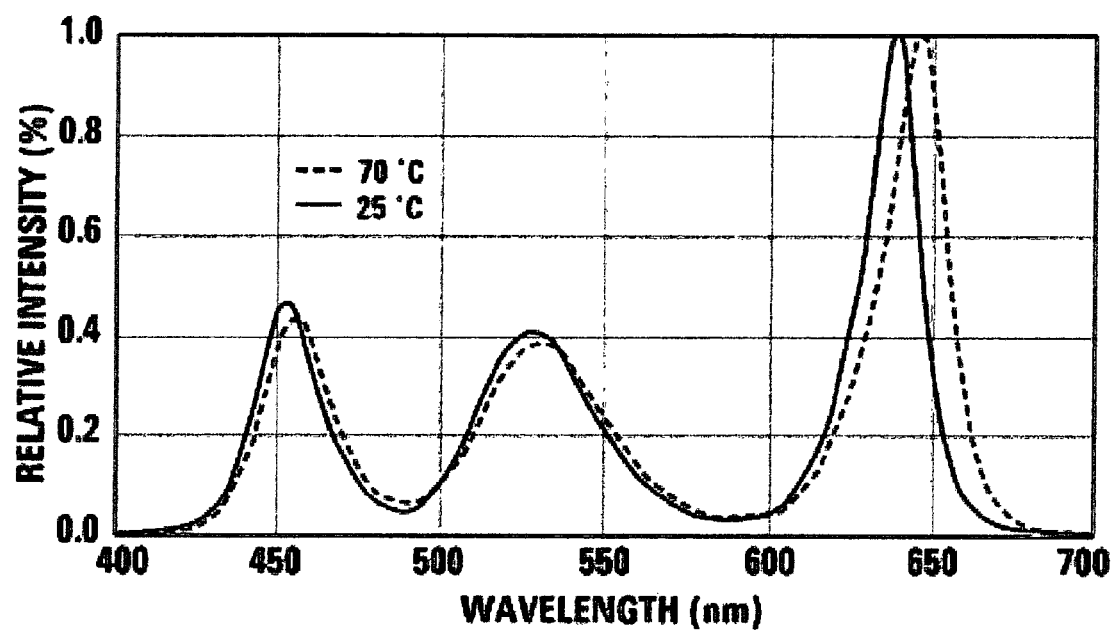
FIG. 11 shows the spectral shift with temperature of a known LED.

As discussed above, an alternative approach is to employ a stable pulsed LED light source to produce a repeatable signal in the detector. There are however two problems with this method. First, although the light pulse will characterised the photo-detector and subsequent signal processing stages, it does not reveal variation in light output from scintillating crystal which as shown in FIG. 7, can be up to 20% for standard Alkaline Halide scintillators over a temperature range of −20 to +50° C. Second the light source used, typically LEDs, are themselves subject to variation with temperature. FIG. 10 is an illustrative example of LED relative intensity shift over temperature. Normalized at 25° C. Avago Technologies. FIG. 11 is an illustrative example of LED spectral shift over temperature. Chromaticity shift duv <0.005. Avago Technologies.

The invention seeks to mitigate some of the problems associated with prior art pulsed LED source methods and systems to provide for more effective calibration and in particular gain stabilisation of a gamma ray scintillator radiation detector such as that in FIGS. 1 and 2. Accordingly an LED light source (such as shown in the example representations of FIGS. 3 to 5) for example a visible LED light source, may be incorporated within the housing and positioned to supply pulsed illumination to the gamma ray scintillator and associated SiPM for example on power up or during use.

The method thus involves the general known principle of the use of a stable pulsed LED to illuminate the photodetector and the numerical processing of the response of the photodetector to that pulsed illumination. The key characterising feature of the method is that it involves measuring not only mean channel excited by the pulsed LED, but variance of pulse height (or resolution). This enables the number of photons captured to be calculated using the formulas below. This largely removes LED variability from the calibration.

Where detector resolution is defined as the Full Width Half Maximum (FWHM) or ΔE divided by peak energy E, the contribution of the different noise sources, to overall resolution R, can be described as follows $$\left(\frac{\Delta E}{E}\right)^2 = R^2 = R_{inh}^2 + R_p^2 + R_{DN}^2$$

Where, $R_{inh}$ is the inherent resolution in the crystal (which to a first approximation is fixed), $R_{DN}$ is contributed by dark noise in the photo-detector (while this is proportional to temperature it is readily characterised, and for the latest generation of SiPMs will be a relatively small factor at normal operating temperatures). This leaves the term $R_p$ as the main variable, which is due to photo collection statistics in the photo-detector, calculated as follows.

$$R_p = 2.35\sqrt{(1+Var(M))/N_p}$$

Where Var(M) is the gain variance of the photo-detector, and $N_p$ is the number of photons collected. Hence from ΔE and E the number of photons captured during calibration can be calculated.

A burst of LED pulses injected into the photo-detector (e.g. on power up) will verify photon sensitivity, and can be made relatively insensitive to LED luminosity.

A number of additional techniques can be employed to mitigate further the limiting factors by additionally compensating for temperature drift in LEDs based on known techniques from established methods based on pulsed LED systems.

These include for example direct temperature compensation, whereby the temperature at the LED is monitored using a suitable temperature measuring device (not shown) and used to compensate for variation in intensity, and using the ratio of pulse height from an LED with two or more bias voltages.

In a further refinement such as illustrated by the example schematic embodiment in FIG. 5, in addition to a visible LED light source, a UV LED light source may be incorporated within the housing and positioned to supply pulsed illumination to the gamma ray scintillator. By exciting luminescence in the scintillator directly this may enable characterisation of the complete system including the scintillator. The use of UV LEDs can further verify integrity of the scintillator crystal and light collection path, including cladding, optical coupling etc.

Thus, this preferred embodiment combines:

using variance in pulse height (for a visible LED) to determine the number of photons detected, thus making the system relatively independent of LED brightness;

using a UV LED to interrogate scintillator brightness as well as photo-detector gain change;

employing a dual LED (visible and UV) to combine the benefits of the above two in a compact portable device.

The invention claimed is:

1. A method of operation of a scintillator detector comprising a scintillator and a photodetector, the method comprising:

periodically producing a light pulse;

impinging at least some of the light from a successive plurality of such light pulses onto a light-receptive part of the photodetector;

measuring the electrical response of the photodetector;

processing the electrical response of the photodetector to determine a pulse height and a variance of pulse height;

numerically processing the pulse height and variance of pulse height so determined to obtain at least a first data item characteristic of the response of the photodetector;

wherein a light source is provided configured to emit light in the ultraviolet spectrum;

periodically producing a light pulse including light in the ultraviolet spectrum;

impinging at least some of the UV light from a successive plurality of such light pulses onto a light-receptive part of the scintillator;

measuring the electrical response of the scintillator;

processing the electrical response of the scintillator to obtain at least a second data item characteristic of the response of the scintillator; and the use of a visible light source impinging on the photodetector to obtain the first data item and thereby a measure of photodetector gain change and the use of a separate ultraviolet light source impinging on the scintillator to obtain the second data item and thereby a measure of scintillator brightness.

2. The method in accordance with claim 1, comprising verifying the electrical response of the photodetector by comparing at least the first data item against a predetermined reference response.

3. The method in accordance with claim 1, comprising outputting a control signal to the photodetector, which signal is modified in part responsive at least to the value of the first data item.

4. The method in accordance with claim 1, comprising numerically processing the pulse height and variance of pulse height so determined to obtain at least a first data item characteristic of the response of the photodetector comprises generating a first data item correlated to the total number of photons detected at the photodetector.

5. The method in accordance with claim 1, wherein the light source is a light-emitting diode (LED) source comprising at least one LED.

6. The method in accordance with claim 1, wherein the scintillator comprises a gamma ray scintillator.

7. The method in accordance with claim 1, wherein the scintillator comprises a solid state scintillator.

8. The method in accordance with claim 1, wherein the scintillator comprises an alkali metal halide scintillator optionally doped with an activator.

9. The method in accordance with claim 1, wherein the photodetector comprises a photomultiplier.

10. The method in accordance with claim 1, wherein the photodetector comprises a silicon photomultiplier.

11. The method in accordance with claim 1, comprising a light source temperature compensation step, wherein a measurement is taken of the temperature of the light source, and a correction factor is applied to the measured response of the photodetector, for example dynamically pulse by pulse, that corrects for the known variation of the light output of the light source with temperature.

12. The method in accordance with claim 1, comprising a photodetector temperature compensation step, wherein a measurement is taken of the temperature of the photodetector, and a correction factor is applied to the measured response of the photodetector, for example dynamically pulse by pulse, that corrects for the known variation of the photodetector response with temperature.

13. The method in accordance with claim 1, wherein a light source is provided configured to emit light in the visible spectrum.

14. The method in accordance with claim 1, employing a visible light LED source and a UV LED source.

15. The method in accordance with claim 14, wherein the visible LED source comprises a second UV LED source equivalent to first LED source but overcoated with a temperature stable fluorescent material to fluoresce in the visible spectrum.

16. The method in accordance with claim 1, comprising verifying the electrical response of the scintillator by comparing at least the second data item against a predetermined reference response.

17. The method in accordance with claim 16, comprising optionally additionally or alternatively outputting a control signal to the photodetector, which signal is modified in part responsive at least to the value of the second data item.

18. The method in accordance with claim 1, comprising outputting a control signal to the photodetector, which signal is modified in part responsive at least to the value of the second data item.

* * * * *